United States Patent
Harty et al.

(10) Patent No.: US 12,340,275 B2
(45) Date of Patent: Jun. 24, 2025

(54) METHOD FOR MANIPULATING CHARGED PARTICLES

(71) Applicant: OXFORD IONICS LIMITED, Begbroke (GB)

(72) Inventors: Tom Harty, Begbroke (GB); Chris Ballance, Begbroke (GB); Jochen Wolf, Begbroke (GB)

(73) Assignee: OXFORD IONICS LIMITED, Begbroke (GB)

( * ) Notice: Subject to any disclaimer, the term of this patent is extended or adjusted under 35 U.S.C. 154(b) by 464 days.

(21) Appl. No.: 17/913,670

(22) PCT Filed: Mar. 31, 2021

(86) PCT No.: PCT/GB2021/050805
§ 371 (c)(1),
(2) Date: Sep. 22, 2022

(87) PCT Pub. No.: WO2021/205145
PCT Pub. Date: Oct. 14, 2021

(65) Prior Publication Data
US 2023/0114436 A1    Apr. 13, 2023

(30) Foreign Application Priority Data
Apr. 7, 2020   (GB) ...................... 2005099

(51) Int. Cl.
*G06N 10/40*   (2022.01)
*G21K 1/00*    (2006.01)

(52) U.S. Cl.
CPC ............... *G06N 10/40* (2022.01); *G21K 1/00* (2013.01)

(58) Field of Classification Search
CPC .................. G06N 10/40; G21K 1/00
See application file for complete search history.

(56) References Cited

U.S. PATENT DOCUMENTS

2009/0045355 A1* 2/2009 Desbrandes ............ H01J 43/18
                                                 250/503.1
2009/0268276 A1   10/2009 Lee et al.
(Continued)

FOREIGN PATENT DOCUMENTS

WO   2015128438 A1   9/2015

OTHER PUBLICATIONS

English Translation of Office Action issued in corresponding Japanese Patent Application No. 2022-561666 mailed Oct. 28, 2024, all pages cited in its entirety.
(Continued)

*Primary Examiner* — Nicole M Ippolito
(74) *Attorney, Agent, or Firm* — Burr & Forman LLP

(57) ABSTRACT

A method is presented, which includes trapping a charged particle at a first position using an electromagnetic trap and providing a static magnetic field at the first position such that a qubit transition of the charged particle is defined, and providing, using an entangling electrode, an oscillating magnetic field. The oscillating magnetic field present at the first position does not contain a polarisation component which directly couples to the qubit transition. The oscillating magnetic field has a spatial gradient at the first position, of the polarisation component of the oscillating magnetic field which couples the qubit transition to the motion of the charged particle.

14 Claims, 6 Drawing Sheets

(56) References Cited

U.S. PATENT DOCUMENTS

2009/0321719 A1    12/2009  Folman et al.
2021/0116784 A1*   4/2021   Sutherland ................ G02F 3/00

OTHER PUBLICATIONS

International Preliminary Report on Patentability from International Application No. PCT/GB2021/050805 issued Oct. 6, 2022, all enclosed pages cited.
Carsjens, M., et al: "Surface-electrode Paul trap with optimized near-field microwave control," Applied Physics B, Nov. 2, 2013, pp. 243-250, vol. 114, No. 1-2; Retrieved from: http://link.springer.com/article/10.1007/s00340-013-5689-6/fulltext.html.
Ospelkaur, C., et al.: "Trapped-Ion Quantum Logic Gates Based on Oscillating Magnetic Fields," Physical Review Letters, Aug. 29, 2008, pp. 1-4, vol. 101, No. 9, Published by American Physical Society, US; Retrieved from https://journals.aps.org/prl/abstract/10.1103/PhysRevLett.101.090502.
Paul Bogdan Antohi: "Cryogenic Surface Electrode Ion Traps with Integrated Superconducting Microwave Resonators for Polar Molecular Ion Spectroscopy," MIT Library Archives, Oct. 31, 2011, MIT; Retrieved from https://dspace.mit.edu/handle/1721.1/68866.
International Search Report and Written Opinion from International Application No. PCT/GB2021/050805 mailed Aug. 5, 2022, all pages cited in its entirety.

* cited by examiner

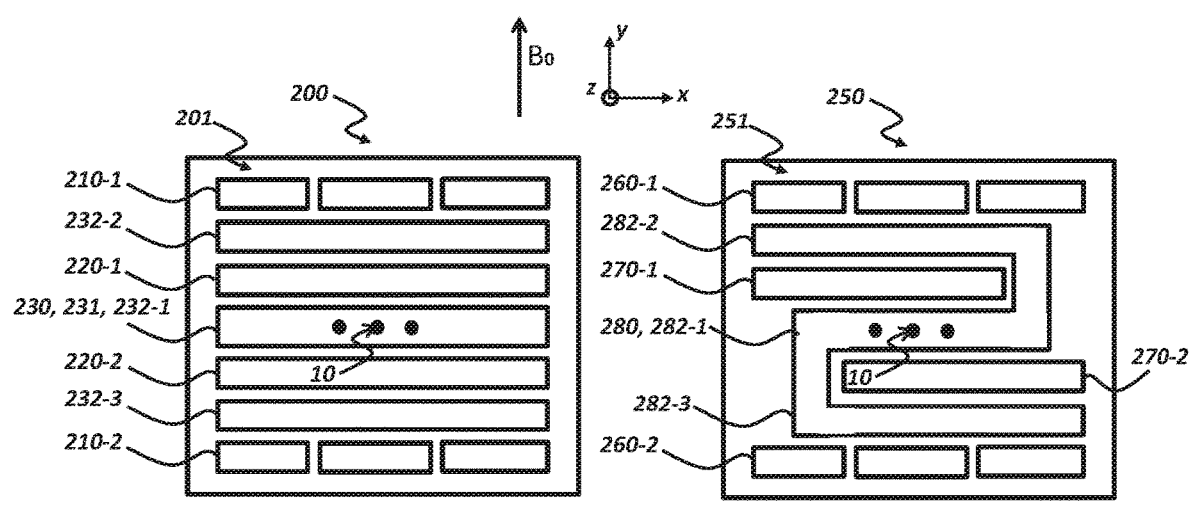

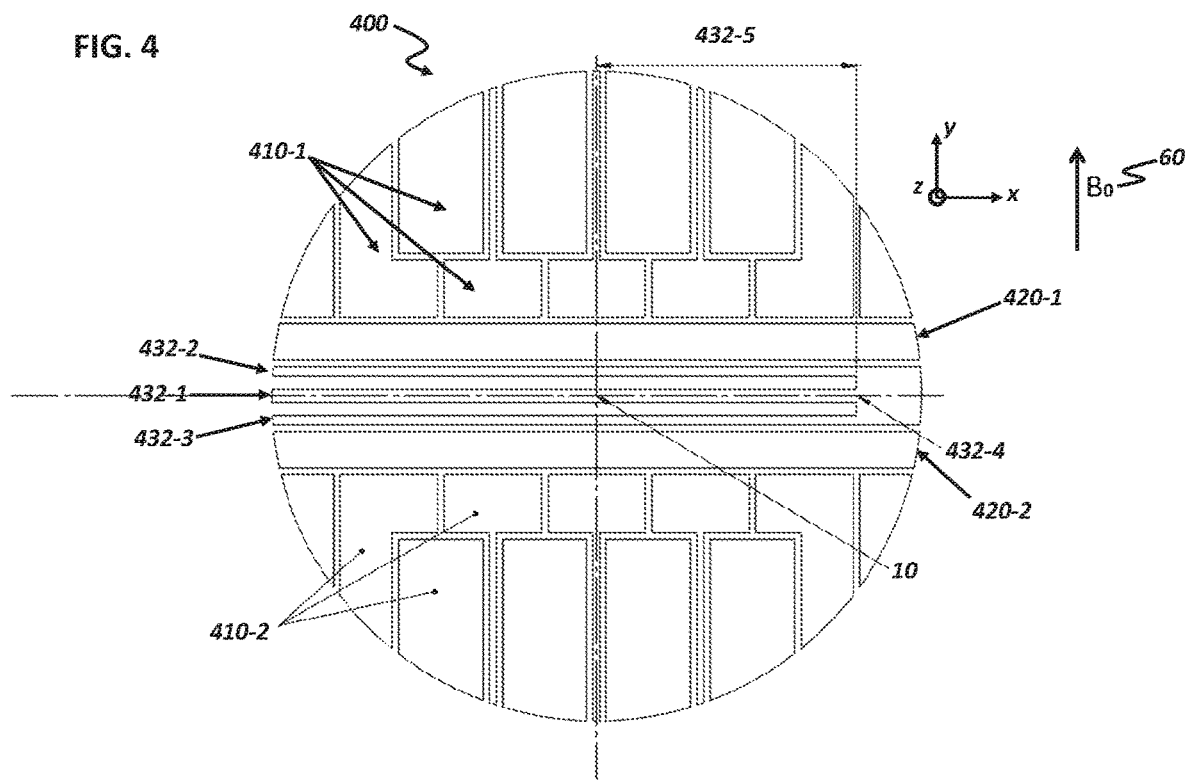

METHOD FOR MANIPULATING CHARGED PARTICLES

TECHNICAL FIELD

This specification relates to quantum sensing and computing using charged particles.

BACKGROUND

Trapped charged particles are a promising platform for the quantum sensing and computing. As in the other candidate technologies, challenges lie in achieving a high level of fidelity in elementary logic operations and in scaling the system to a larger number of qubits.

SUMMARY

According to an aspect of the present invention, there is provided a method comprising: trapping a charged particle at a first position using an electromagnetic trap; providing a static magnetic field at the first position such that a qubit transition of the charged particle is defined; and providing, using an entangling electrode, an oscillating magnetic field. The oscillating magnetic field present at the first position does not contain a polarisation component which directly couples to the qubit transition. The oscillating magnetic field has a spatial gradient at the first position, of the polarisation component of the oscillating magnetic field which couples the qubit transition to the motion of the charged particle.

In some implementations, the entangling electrode extends in a first direction perpendicular to the direction of the static magnetic field. The qubit transition is a sigma transition between states whose respective magnetic quantum numbers differ by 1, and the oscillating magnetic field at the first position is linearly polarised, parallel to the direction of the static magnetic field such that the oscillating magnetic field does not couple directly to the qubit transition.

In some implementations, the entangling electrode comprises a co-planar waveguide.

In some implementations, the co-planar waveguide comprises: a centre track; a first return track; and a second return track. The centre track extends in the first direction between the first return track and the second return track, and the first return track and the second return track are electrically connected to a ground terminal shared with the electromagnetic trap.

In some implementations, the co-planar waveguide further comprises a shorting connection. The first return track, the second return track and the centre track are electrically connected to a shorting connection at one end. The distance in the first direction between the first position and the shorting connection is smaller than $\lambda/4$, wherein $\lambda$ is a wavelength of the oscillating magnetic field in the co-planar waveguide.

In some implementations, the co-planar waveguide is formed to be symmetric about the centre track.

In some implementations, the method further comprises: trapping a second charged particle at a second position using the electromagnetic trap; providing the static magnetic field such that the magnitude and the direction of the static magnetic field is the same at the first position and the second position; and providing, using the entangling electrode, the oscillating magnetic field for the second charged particle. The entangling electrode extends in a direction parallel to a direction of a line connecting the first position and the second position such that the oscillating magnetic field present at the second position does not contain a polarisation component which couples to a qubit transition of the second charged particle.

In some implementations, the method further comprises creating a spin-dependent force on the charged particle and the second charged particle by exciting one or more motional sidebands of the qubit transition with the oscillating magnetic field.

According to another aspect of the present invention, there is provided a device for generating quantum entanglement between charged particles, comprising: a substrate having a first face and a second face opposite to each other; a trap electrode disposed on the first face of the planar substrate configured, in response to a voltage, to form an electromagnetic trap for trapping a charged particle at a first position such that the first face is interposed between the first position and the second face; and an entangling electrode disposed on the first face of the planar substrate and extending in a first direction along the substrate, configured, in response to an oscillating current, to generate an oscillating magnetic field parallel to the substrate and perpendicular to the first direction at the first position.

In some implementations, the entangling electrode comprises a co-planar waveguide.

In some implementations, the co-planar waveguide comprises: a centre track; a first return track; and a second return track. The centre track extends in the first direction between the first return track and the second return track, and the first return track and the second return track are electrically connected to a terminal held at fixed potential to a ground terminal of the trap electrode.

In some implementations, the first return track, the second return track and the centre track are electrically connected to a shorting connection at one end.

In some implementations, a width of the first return track and the second return track is wider than a penetration depth of a material for the first return track and the second return track at a frequency of the oscillating magnetic field.

In some implementations, the electromagnetic trap is a surface-electrode Paul trap.

In some implementations, the surface-electrode Paul trap is configured such that a symmetry axis of the electromagnetic trap lies along the first direction.

In some implementations, the surface-electrode Paul trap comprises: a first RF electrode and a second RF electrode extending in the first direction; and a first DC electrode and a second DC electrode extending in the first direction. The first RF electrode and the second RF electrode are disposed between the first DC electrode and the second DC electrode, and the entangling electrode is disposed between the first RF electrode and the second RF electrode.

In some implementations, there is provided a system for quantum information processing comprising: a plurality of charged particles; an aforementioned device for entangling two or more of the plurality of charged particles; a device for generating a static magnetic field; and a signal generator for generating electric signals for the electromagnetic trap and the entangling electrode;

BRIEF DESCRIPTION OF THE DRAWINGS

Certain embodiments of the present invention will now be described, by way of examples, with reference to the accompanying drawings, in which:

FIG. 2 is a schematic diagram of a surface-electrode trap for producing a nulled magnetic field distribution.

FIG. 4 is a schematic diagram of an exemplary embodiment of a surface-electrode trap for producing a partially nulled magnetic field distribution.

DETAILED DESCRIPTION

For implementation of a general-purpose quantum computer using charged particles, a qubit may be implemented from a transition between states of a charged particle with a resonance frequency in RF/microwave domain. For example, for an atomic ion, a hyperfine transition can be used as a qubit.

These microwave transitions were usually manipulated via an optical transition due to the convenience in addressing each charged particle with a focused laser beam and the strong coupling between the spin and motional degrees of freedom produced by short wavelength optical radiation. The present specification relates to a laser-free method for generating quantum entanglement between trapped charged particles. A corresponding apparatus is presented for generating quantum entanglement between trapped charged particles.

Figure 1:
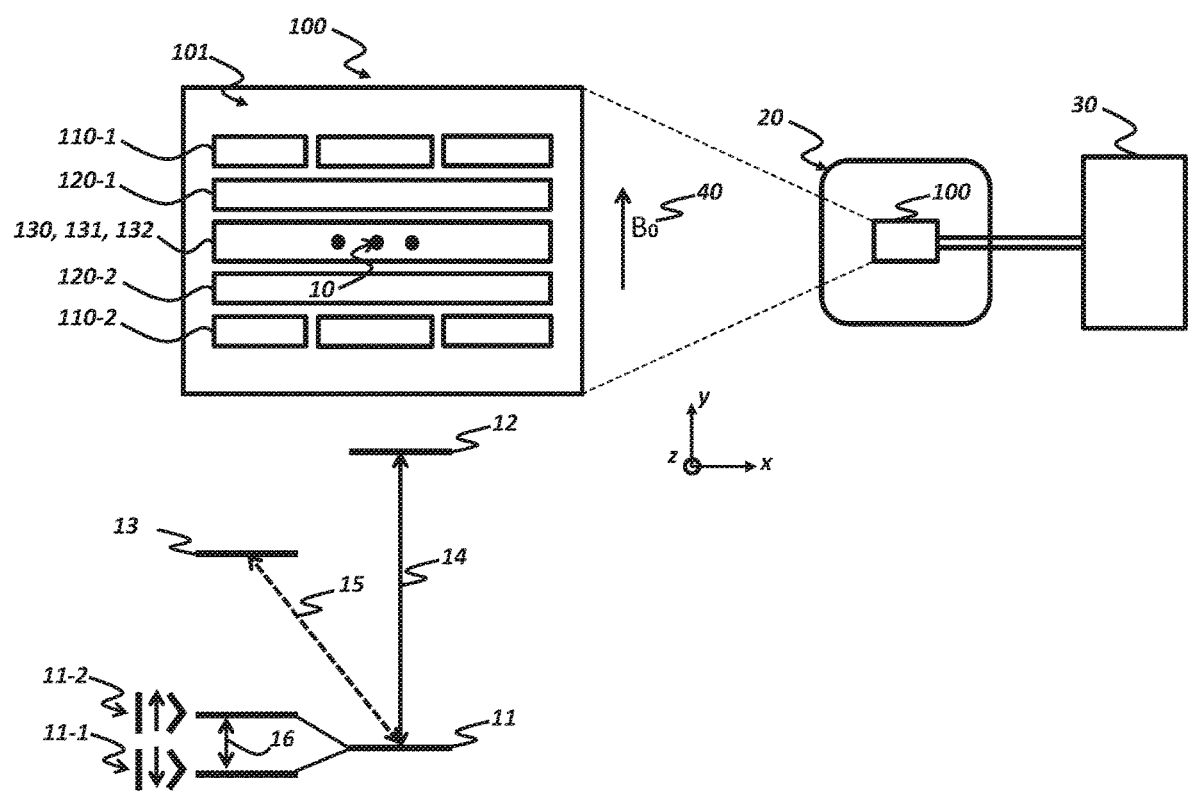
FIG. 1 is a schematic diagram of a system for quantum information processing using trapped charged particles.

FIG. 1 is a schematic diagram of a system for quantum information processing using trapped charged particles.

A charged particle 10 may be trapped in a vacuum chamber 20. The vacuum chamber 20 provides an ultrahigh vacuum environment allowing individual charged particles 10 to be isolated. Using radiofrequency or microwave electric fields, the charged particle 10 may be confined within a predetermined volume of space, where the motion of the charged particle 10 can be cooled close to its motional ground state.

In this specification, the term "charged particle" will be used to mean an atom, a molecule or an ion with a net electric charge. In particular, the charged particle 10 also includes an elementary charge particle such as an electron or a positron.

Surface-Electrode Trap

One or more charged particles 10 may be trapped near the surface of a surface-electrode trap 100. The surface-electrode trap wo may be configured to create the electromagnetic trap in response to voltages provided to the surface-electrode trap 100. For example, the surface-electrode trap wo may be a radiofrequency Paul trap. For convenience, in this specification, a radiofrequency Paul trap will be discussed as the example of the surface-electrode trap 100.

The surface-electrode trap wo includes a substrate 101 and a plurality of electrodes 110, 120, 130 micro-fabricated on a first surface of the substrate 101.

In some implementations, the electrodes 110, 120, 130 may form one or more elements for trapping, manipulating and entangling the charged particles 10. The two-dimensional layout of the electrodes 110, 120, 130 on the first surface of the substrate 101 may be extendable to a large array of multiplexed traps for a scalable quantum information processing or quantum computing using trapped charged particles 10, known as a quantum CCD (Nature 417, 710-711 (2002)). For brevity, FIG. 1 only depicts a single unit of a possibly large array of multiplexed traps.

Voltages and currents may be applied to the surface electrodes 110, 120, 130 to serve several purposes. In this specification, we will refer to these voltages and currents by the typical frequency range they lie in: "RF" voltages to produce the ponderomotive confining potential; lower frequency "DC" voltages to produce the static confining potential and to transport ions around the chip; and "microwave" currents to drive quantum logic operations and produce entanglement.

The distance between the trapped charged particle 10 and the electrodes, 110, 120, 130 may be smaller than the wavelength of the RF or microwaves, and is therefore in the so-called nearfield regime.

Quantum information stored in a plurality of charged particles 10 can be processed using magnetic fields generated by electrodes 110, 120, 130. In particular, the magnetic fields generated by the electrodes 110, 120, 130 can be used to produce entanglement between the charged particles 10.

In some implementations, the surface-electrode trap wo may include a first DC electrode 110-1, a second DC electrode 110-2, a first RF electrode 120-1, a second RF electrode 120-2, and a central electrode 130.

The electrodes 110, 120, 130 may be a conductor extending in one direction. For example, in FIG. 1, the RF electrodes 120, and the central electrode 130 extend in x-direction.

In some implementations, one or more of the electrodes 110, 120, 130 may be formed from a flat strip or a wire.

The first RF electrode 120-1, the second RF electrode 120-2 and the central electrode 130 may be disposed between the first DC electrode 110-1 and the second DC electrode 110-2.

In some implementations, the central electrode 130 may be disposed between the first RF electrode 120-1 and the second RF electrode 120-2.

Although in FIG. 1 the central electrode 130 is depicted as a single strip, the geometry of the central electrode 130 may include further structures and functional features, therefore is not limited to being a flat strip or a single wire. In particular, the central electrode 130 may include further features suitable for high fidelity entangling operation of the interacting charged particles 10. In some implementations, microwaves are applied to the DC electrodes 110-1, 110-2.

In some implementations, the central electrode 130 may include a central DC electrode 131 and an entangling electrode 132. The central DC electrode 131 may be used for trapping the charged particle 10, as part of a surface Paul trap which will be discussed hereinafter, and the entangling electrode 132 may be used for generating a microwave field for entangling two or more trapped charged particles 10. However, both the central DC electrode and the entangling electrode 132 contribute to entanglement and trapping in that both the central DC electrode 131 and the entangling electrode 132 are held at an RF ground and in that for any radiofrequency signal, the return currents flow through the central DC electrode 131.

In some implementations, the entangling electrode 132 may be configured to generate an electromagnetic field gradient, whereby the magnitude of the field near the charged particle 10 includes a spatial variance. This can be used to provide a state-dependent force on the charged particle 10 used to generate entanglement between charged particles 10.

In some implementations, when the surface-electrode trap 100 includes several internal layers to route signals, the entangling electrode 132 may not be place on the surface of the substrate 101 but on one of the internal layers.

In some implementations, the central electrode 130 may include separate structures, respectively for the central DC electrode 131 and the entangling electrode 132. Alternatively, in some implementations, the central electrode 130 may form one integrated conductor, a single wire or a single strip, which can serve both as the central DC electrode 131 and the entangling electrode 132. Alternatively, in some implementations, the central electrode 130 may form one integrated conductor, a single wire or a single strip, which serves only as the entangling electrode 132. In some implementations, the central DC electrode 131 may comprise two or more strips of electrodes.

The electrodes 110, 120 130 may be electrically connected to an electronic control unit 30.

The electronic control unit 30 may include at least one DC source, and at least one RF source or microwave source. In some implementations, the electronic control unit 30 may include a DC source, an RF source and a microwave source. The examples of the RF source or the microwave source include a direct digital synthesizer.

In response to the signals received from the electronic control unit 30, the electrodes 110, 120, 130 may be designed and configured to create an electromagnetic potential for trapping the charged particle 10. For example, the electrodes 110, 120, 130 may form a surface-electrode Paul trap for trapping the charged particle 10.

The implementation of the surface-electrode Paul trap using the electrodes 110, 120, 130 will be described below. However, the method of trapping the charged particle 10 is not limited to these examples. As long as it is compatible with the design of the entangling electrode 132 as will be detailed in this specification, any method of trapping the charged particle 10 may be employed to the surface-electrode trap 100. For example, there can be various ways of implementing a Paul trap or a Penning trap that may be used for the purpose of trapping the charged particle 10.

In order to trap the charged particle 10, the first DC electrode 110-1, the first RF electrode 120-1, the central DC electrode 131, the second RF electrode 120-2, the second DC electrode 110-2 may form so-called "5-wire surface trap," "5-wire Paul trap" or "5-wire design" (Quantum Information and Computation, Vol. 5, No. 6 (2005) 419-439). These 5 electrodes 110-1, 110-2, 120-1, 120-2, 131 facilitate forming a trap of the charged particles 10 at a fixed distance d from the surface of the substrate 101 in response to the voltages provided to these electrodes by the electronic control unit 30. The trapped charged particle 10 oscillates around the centre of the trap. The charged particle 10 may be cooled such that the amplitude of this motion is reduced.

In some implementations, the first DC electrode 110-1, the first RF electrode 120-1, the central DC electrode 131, the second RF electrode 120-2, the second DC electrode 110-2 may be in the form of a conductor strip or a wire.

In some implementations, the first RF electrode 120-1, the central DC electrode 131, and the second RF electrode 120-2 may be parallel to one another. For example, as shown in FIG. 1, these electrodes may extend in the x-direction.

In some implementations, the first DC electrode 110-1, the first RF electrode 120-1, the central DC electrode 131, the second RF electrode 120-2, the second DC electrode 110-2 may be arranged such that the RF electrode 120-1, 120-2 is interposed by two of the DC electrodes 110-1, 110-2. For example, in FIG. 1, the electrodes 110, 120, 130, extending in the x-direction can be arranged along the y-direction in the following order: the first DC electrode 110-1, the first RF electrode 120-1, the central DC electrode 131, the second RF electrode 120-2, and the second DC electrode 110-2.

In some implementations, the first DC electrode 110-1, the first RF electrode 120-1, the central DC electrode 131, the second RF electrode 120-2, the second DC electrode 110-2 may be parallel to one another and arranged symmetrically with respect to an axis defined in the direction of the extension of the electrodes. For example, as shown in FIG. 1, the first DC electrode 110-1 and the second DC electrode 110-2 may be positioned at an equal distance in the y-direction from the central DC electrode 131.

Similarly, the first RF electrode 120-1 and the second RF electrode 120-2 may be positioned at an equal distance in the y-direction from the central DC electrode, such that the 5 electrodes 110-1, 110-2, 120-1, 120-2, 131 are arranged symmetrically with respect to the x-axis. In some implementations, in addition to being arranged symmetrically, the widths of the electrodes, 110-1, 110-2, 120-1, 120-2, which are symmetrical counterparts with respect to the x-axis may be the same. For example, the first RF electrode 120-1 and the second RF electrode 120-2 may have the same width in the y-direction. In this case, the x-axis forms a complete symmetry axis for the trap formed from the 5 electrodes 110-1, 110-2, 120-1, 120-2, 131.

By applying voltages using the electronic control unit 30 to the first RF electrode 120-1, the second RF electrode 120-2, the first DC electrode 110-1, the second DC electrode 110-2 and the central DC electrode a Paul trap may be formed near the surface of the substrate.

Typically, an RF voltage is applied with frequency in the range 10 to 100 MHz to the first RF electrode 120-1 and the second RF electrode 120-2 by the electronic control unit 30 as well as a DC voltage.

The distance d, in z-direction, between the equilibrium position of the charged particles 10, known as the "trap centre", and the substrate 101 ranges typically from 10 to 100 microns. The local minimum in the RF pseudo-potential field forms a trap axis along the axial (x) direction, a distance d above the central electrode 130. Therefore, when a plurality of charged particles 10 are trapped, these may be aligned along the direction of the extension of the central electrode 130.

In some implementations, the first DC electrode 110-1 and the second DC electrode 110-2 may be segmented in the longitudinal direction, as depicted in FIG. 1. Each segment may be maintained at a different DC voltage, which may be controlled as necessary. This enables shuttling of the charged particles 10 in the longitudinal direction, or x-direction in FIG. 1.

Once the charged particle 10 is trapped in space as described above, the charged particle 10 may be cooled, addressed and manipulated as described below.

Cooling and Detecting Charged Particles

The charged particle 10 may include internal energy levels 11, 12, 13, which are electronic levels. These internal energy levels 11, 12, 13 may include states such as Zeeman states and hyperfine states. These energy levels 11, 12, 13 may be influenced by external biases such as an electric field or a magnetic field. For example, degeneracy of some of the internal energy levels 11, 12, 13 may be lifted by applying external biases such as a static magnetic field. Due to the motions of the charged particles 10 within a trap, the state space is a product of the electronic levels 11, 12, 13 and the motional states.

A unit of quantum information, a qubit, can be stored in two states within the energy levels 11, 12, 13 of the charge particles 10. The qubit states may sometimes be referred to as '0' and '1' states, or 'up' and 'down' states.

The charged particle 10 may include a ground level 11 and an excited level 12. There may be at least one electric dipole allowed transition, between the ground level 11 and the excited level 12, a first transition 14.

The first transition 14 may lie in the optical regime, ranging from UV to near IR, where conventional light sources and detectors are available for excitation and detection.

A spontaneous decay of the state from the excited level 12 leads to the emission of an optical photon from the charged particle 10, which may be used for the detection of the charged particle 10.

To this end, a shelving level 13 may be an electronic level of the charge particle 10 with a long lifetime.

For example, the ground level 11 may be $4S_{1/2}$ level of $^{40}Ca^+$ and the shelving level 13 may be the $3D^{5/2}$ level. When the charged particle 10 is in the ground level 11, application of a laser resonant with the transition 14 results in fluorescence being emitted. As a result, the qubit state may be inferred from the fluorescence by first using a narrow-linewidth laser resonant with the transition 15 to transfer one qubit state to the shelf level.

In case the charged particle 10 is an elementary charge particle, such as an electron or a positron, for example, its motion may be detected by observing currents induced in trap structures.

In addition to the electromagnetic trapping provided by a 5-wire Paul trap as discussed above, the spatial movement of the charged particle 10 may be further confined and slowed down by laser cooling methods, such as Doppler cooling.

In some implementations, an allowed optical transition such as the first transition 14 of the charged particle 10 may be used for Doppler cooling.

As a basic unit of storage and processing of quantum information, a 'ground-level qubit' may be implemented using a qubit transition 16 between states in the ground level 11, namely a first qubit state 11-1 and a second qubit state 11-2, as '0' and '1' states or a lower qubit state and a upper qubit state. For example, the qubit states 11-1, 11-2 of the ground level qubit may be two of the Zeeman states or hyperfine states. These qubit states 11-1, 11-2 may be mapped to the states of the first transition 14 for readout.

Zeeman Levels and Hyperfine Levels for the Qubit Transition

The ground level 11 may include hyperfine structure. Also under a static magnetic field 40, the states within the ground level 11 may be split due to the Zeeman effect.

In some implementations, where there is no hyperfine structure, the first qubit state 11-1 and the second qubit state 11-2 may be two Zeeman states within the ground level 11.

In order to reliably readout the qubit states 11-1, 11-2, the respective qubit states 11-1, 11-2 may be mapped to an 'optical qubit'. For example, if the first qubit state 11-1 is mapped to the shelving state 13, and the second qubit state 11-2 remains coupled to the cycling transition around the first transition 14, a high fidelity state detection of the qubit states 11-1, 11-2 can be performed by measuring number of photons emitted from the charged particle 10 within a fixed time interval within the lifetime of the shelving state 13.

In some implementations, the first qubit state 11-1 and the second qubit state 11-2 may be two hyperfine states of the ground level 11.

Hyperfine structure allows transitions which become independent of magnetic field to first order at certain fields. Typically, the resonance frequency of the qubit transition 16 is in the GHz range, or in the microwave. For example, $S_{1/2}$ level of $^{43}Ca^+$ ground level 11 is split into two different values of F, F=3, 4, split by 3.226 GHz at zero field.

In some implementations, the first qubit state 11-1 and the second qubit state 11-2 may be two stretched states of the hyperfine levels, with maximum $M_F$ quantum number for a given F value. These states may allow convenient state preparation and detection. For example $S^{3,+3}_{1/2}$ and $S^{4,+4}_{1/2}$ states may be prepared by optical pumping and read out by exciting the first transition 14 with σ+ polarised light.

When the stretched states of the hyperfine levels are used as qubit states, 11-1, 11-2, one of the qubit states 11-1, 11-2 can be mapped to the shelving states 13 by a narrow quadrupole transition exciting the second transition 15 as discussed above.

In providing the magnetic fields to excite the qubit transition 16, it may also be considered whether any components of the nearfield of the microwave which does not couple to the qubit transition 16 may excite other transitions. This may affect the fidelity of quantum information processing.

Entangling Qubits

In providing the electromagnetic fields to excite the qubit transition 16 of the charged particle 10, the polarization of the electromagnetic fields should be provided considering the direction of the static magnetic field 40, or equivalently the direction of the quantization axis of the charged particle 10. The static magnetic field 40 defines the quantization axis of the charged particle 10, therefore polarisation of the microwave field, which can couple to the qubit transition 16.

A sigma transition σ transition refers to a transition 16 of the charged particle 10 between states whose magnetic quantum numbers differ by 1. Only electromagnetic field components perpendicular to the direction of the static magnetic field 40 couple to sigma transitions.

A pi transition or π transition refers to a transition 16 of the charged particle 10 between states with the same value of the magnetic quantum number. Only electromagnetic field components parallel to the direction of the static magnetic field 40 couple to pi transitions.

In order to excite a microwave t transition, the qubit transition 16 in FIG. 1, the magnetic field coupling to the transition, for example generated by the entangling electrode 132, should contain non-zero component parallel to the direction of the static magnetic field 40.

Therefore, the surface-electrode trap 100, in particular the entangling electrode 132, may be designed assuming a specific spatial alignment of the surface-electrode trap 100 with respect to the direction of the static magnetic field 40.

In the examples below, the surface-electrode trap 100 is aligned such that the direction of the static magnetic field 40 is set to be parallel to the surface of the substrate 101 and perpendicular to the extension direction of the electrodes 110, 120, 130, unless otherwise noted. For example, in FIG. 1, the static magnetic field 40 is in the x-direction. However, the inventive concepts described herein are not limited this configuration. Any possible design of the surface-electrode trap 100 and the configuration of the electrodes 110, 120, 130 with respect to the direction of the static magnetic field 40 may be used as long as they are compatible with the design of the entangling electrode 132 described hereinafter.

The qubit states 11-1, 11-2 considered in this specification may be any two stable states of the charged particle 10 as long as the qubit transition can be excited with a RF or microwave radiation.

In this specification, an experimental configuration is considered where entanglement is generated by an oscillating RF/microwave magnetic field generated by the entangling electrode 132.

Entanglement between the charged particles 10 may be generated by using a spin-dependent force or state-dependent force to produce an effective spin-spin interaction or an effective interaction between the charged particles 10 which depends on the qubit states 11-1, 11-2. These spin-dependent forces have traditionally been generated using radiation at optical frequencies, for example, by driving stimulated Raman transitions with two lasers detuned from each other by a frequency close to the resonance of the qubit transition 16.

Recently, laser-free approaches, or purely electronic approaches have been introduced where nearfield microwaves with a high spatial gradient are used to generate spin-dependent forces.

The laser-free or electronic techniques have several advantages over laser-based schemes. Lasers introduce a fundamental limit on the fidelity of the entanglement that can be produced due to photon scattering from the excited level 12. No such limit exists for electronic techniques. Also electronic techniques can have much reduced sensitivity to motional state initialization such that Doppler cooling only should be sufficient, instead of relying on near ground-state coupling.

Furthermore, laser-based schemes typically require high optical intensities. Integrating and scaling RF/microwave electronics may be more straightforward than optics, particularly for the UV frequencies often required for laser-based entanglement. Moreover, sources, modulators and other components may be generally smaller, cheaper and require lower power consumption at RF/microwave than optical frequencies. In particular, phase control may be more tenable at RF/microwave than optical frequencies.

One laser-free method uses the oscillating (RF/microwave) magnetic field gradients produced in the near-field of a current-carrying wire to generate the spin-dependent forces. In this case, the wire corresponds to the entangling electrode 132 discussed above.

Creating a Node in the Nearfield Radiation

The spin-dependent force used to generate entanglement is produced by the spatial gradient of the oscillating magnetic field at the position of the charged particles 10. A particular challenge for near-field entanglement arises from the fact that this gradient is generally accompanied by a strong field amplitude, which will couple to the qubit transition 16 and any other ground-level transitions (not shown) which connect to the qubit states.

This unwanted coupling can reduce the fidelity of the entanglement that can be produced. Various approaches have been explored to minimize the impact of this unwanted coupling. For example: using microwave cavity filters to suppress noise;

actively stabilizing the field amplitude; employing dynamical decoupling to suppress frequency shifts introduced by the field.

A different approach eliminates this coupling by operating in a "nulled" configuration. In this configuration, the fields produced by different parts of the entangling electrode 132 interfere to produce an oscillating magnetic field that has zero amplitude at the charged particle's location 10, while still maintaining a strong spatial gradient at that location. Examples of entangling electrodes to produce nulled fields are shown in FIG. 2. However, these configurations may also suffer from limitations as will be discussed below. A design of the entangling electrode 132 to address these issues is presented in FIGS. 3a and 3b.

FIG. 2 is a schematic diagram of a surface-electrode trap for producing a nulled magnetic field distribution.

FIG. 2 shows a surface-electrode trap 200 for implementing an "active nulling geometry" on the left and a surface-electrode trap 250 for implementing a "passive nulling geometry" on the right.

The surface-electrode trap 200 for active nulling includes a substrate 201 and a plurality of electrodes 210, 220, 230 deposited on a first surface of the substrate 201.

The surface-electrode trap 200 includes a first DC electrode 210-1, a second DC electrode 210-2, a first RF electrode 220-1, a second RF electrode 220-2 and a central electrode 230. As in the example of FIG. 1, the central electrode 230 may include a central DC electrode 231 and a first entangling electrode 232-1.

Applying voltages to the DC electrodes 210-1, 210-2 and RF electrodes 220-1, 220-2 with the electronic control unit 30, while holding the central DC electrode 231 and the first entangling electrode 232-1 at RF/DC ground, these electrodes can function as a surface-electrode Paul trap as discussed in FIG. 1. For entangling the charged particles 10, RF/microwave currents can be applied to the first entangling electrodes 232-1.

For the operation of the surface-electrode trap 200 for active nulling, microwave currents may be applied simultaneously to the three collinear conductors, namely the first entangling electrode 232-1, the second entangling electrode 232-2, and the third entangling electrode 232-3, with amplitudes and phases precisely controlled to actively suppress the field amplitude and produce a node or a nulling point at the position of the charged particle 10, while still maintaining a strong field gradient at that point. This approach was proposed, for example, in C. Ospelkaus et. al. Phys. Rev. Lett. 101, 090502 (2008).

This active nulling approach may have several issues: It may be susceptible to drifts in the amplitudes or phases of these microwave currents and to any noise that is not common to all three electrodes 232-1, 232-2, 232-3. At RF/microwave frequencies, microwave qubit control currents may induce currents in the electrodes for the 5-wire surface Paul trap 210-1, 210-2, 220-1, 220-2, 130. Since the RF electrodes 220-1, 220-2 are common to all zones in a multi-zone trap, this can lead to cross-talk across the trap 200.

The surface-electrode trap 250 for passive nulling geometry includes a substrate 251 and a plurality of electrodes 260, 270, 280, 282 deposited on a first surface of the substrate 251. The surface-electrode trap 250 comprises a first DC electrode 260-1, a second DC electrode 260-2, a first RF electrode 270-1 and a second RF electrode 270-2 and a central electrode 280. When voltages are applied to these collinear electrodes 260-1, 260-2, 270-1, 270-2, 280 with the electronic control unit 30, these electrodes act as a surface-electrode Paul trap as discussed above.

As described in M. Carsjens et. al. Appl. Phys. B 114, 243 (2014), the surface-electrode trap 250 for passive nulling geometry includes a meander structure 282, a conducting wire folded back on itself. The meander structure 282 includes, a part corresponding to a first entangling electrode 282-1, parts respectively corresponding to a second entangling electrode 282-2 and a third entangling electrode 282-3 as discussed above. These parts are integrally formed as one meandering strip of conductor 282 in the plane of the substrate 251.

A single current at a RF/microwave frequency can be sent into the meander structure 282 in order to create a node or a null at the position of the charged particle 10 where the oscillating magnetic field amplitude approaches 0 according to a similar principle as the surface-electrode trap 200 for active nulling geometry. The gaps between the RF electrodes 270-1, 270-2 and the meander structure 282 and the width of respective parts of the meander structure may be predetermined in order to create a nulling point at a predetermined position in space above the meandering structure 282.

This technique may have its own issues.

1. Due to the finite length of the nulling electrodes 282-1, 282-2 and the central electrode 280 in x-direction near the charged particle 10, there will be phase shifts along the meandering structure 282, which may prevent a perfect null to be formed.

2. The surface-electrode trap 250 still has the same number of conductors as the surface-electrode trap 200 for active nulling.

3. Due to the close coupling between the meandering conductor structure 282 and other electrodes 260, 270 for the surface Paul trap, there can be considerable cross-talk between zones in multi-zone ion traps or charged particle traps. Minimising cross-talk is particularly important for quantum computing, where low cross-talk across a large multi-zone ion trap is a key requirement.

4. The asymmetric structure of the meandering conductor 282 forming the nulling electrodes 282-1, 282-2, 282-3 and the central electrode 280 may be sensitive to fabrication and simulation tolerance. Moreover, any currents induced in other electrodes can affect the nulling.

The current specification provides a geometry of the surface-electrode trap 100, 200, 250 which facilitates a partial nulling of the field amplitude or a partially nulled magnetic field distribution at the position of the charged particle 10, which may address the issues discussed above. Instead of aiming at a complete null of the magnetic fields at the position of the charged particle 10, the entangling electrode 132, 232, 282 may be designed for specific choices of the qubit states 11-1, 11-2 and the direction of the static magnetic field 40. The entangling electrode 132, 232, 282 is designed with a view to nulling of only the field component that couples to the qubit transition 16 of choice. This may allow a significantly simpler and a symmetric structure of the entangling electrode 132, 232, 282 which can alleviate the issues associated with the active and passive nulling geometries.

Figure 3A:
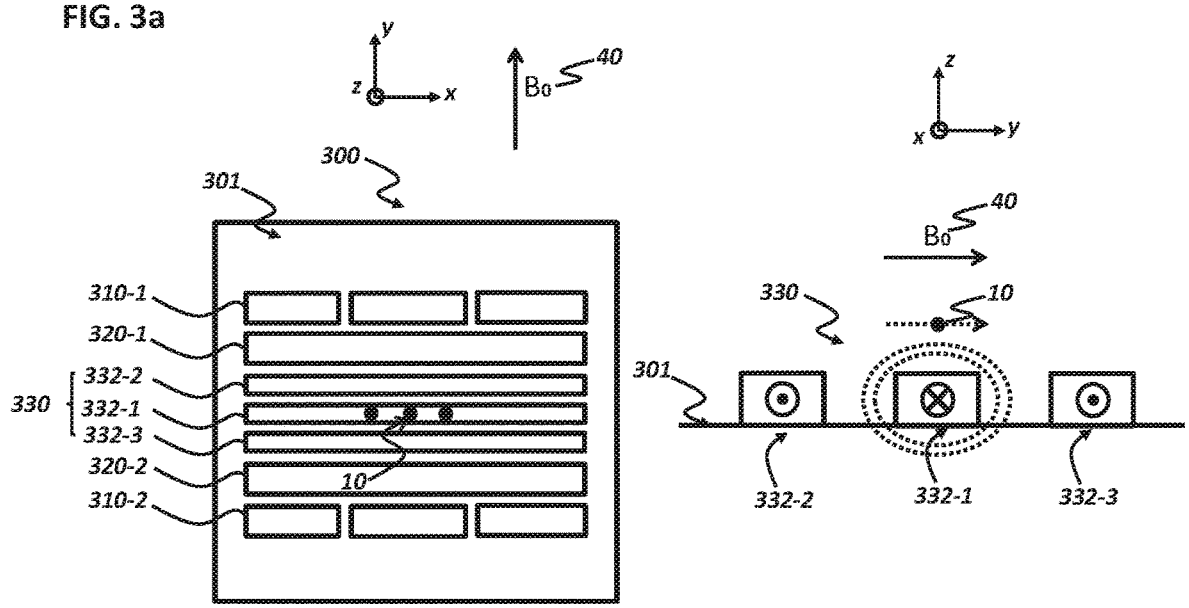
FIG. 3a is a schematic diagram of a surface-electrode trap for producing a partially nulled magnetic field distribution.

FIG. 3a is a schematic diagram of a surface-electrode trap for producing a partially nulled magnetic field distribution.

FIG. 3a shows a surface-electrode trap 300 on the left and a diagram depicting a magnetic field distribution around an entangling electrode 330 of the surface-electrode trap 300 on the right.

The surface-electrode trap 300 includes a first DC electrode 310-1, a second DC electrode 310-2, a first RF electrode 320-1, a second RF electrode 320-2 and a central electrode 330. When voltages are applied to these collinear electrodes 310-1, 310-2, 320-1, 320-2, 330 with the electronic control unit 30, these electrodes can function as a 5-wire surface Paul trap as discussed above.

The central electrode 330 comprises an entangling electrode 332. The entangling electrode 332 comprises a co-planar (or coplanar) waveguide or a transmission line 332 along the x-direction.

The co-planar waveguide 332 includes a centre track 332-1, a first return track 332-2 and a second return track 332-3, all extending in x-direction. The centre track 332-1 is interposed by the return tracks 332-2, 332-3.

In some implementations, the centre track 332-1 and the return tracks 332-2, 332-3 act as the RF and DC ground of the 5-wire surface Paul trap.

The impedance of the co-planar waveguide 332 can be controlled by arranging the dimensions of these tracks. The impedance of the co-planar waveguide 332 is determined by geometric aspects of the co-planar waveguide 332 and largely independent of the operating frequency and the other electrodes 310, 320, 330 in the surface-electrode trap 300. The return tracks 332-2, 332-3 are separated from the centre track 332-1 by a predetermined gap, which may have a constant width along the length of the co-planar waveguide 332 in x-direction. The gaps between the centre track 332-1 and the return tracks 332-2, 332-3 may be determined according to a predetermined impedance of the co-planar waveguide 332.

The centre track 332-1 may function as the signal wire of the co-planar waveguide 332 and the first return track 332-2 and the second return track 332-3 may function as the ground wires of the co-planar waveguide 332.

In some implementations, the co-planar waveguide 332 may be formed to be symmetric about the centre track 332-1.

In some implementations, the first return track 332-2 and the second return track 332-3 may be held at the same potential as the ground plane of the surface-electrode trap 300, in particular as the ground for the 5-wire surface Paul trap.

If the return tracks 332-2, 3332-3 are arranged such that their respective widths are larger than the penetration depth, this may provide screening to reduce cross talk between the trap electrodes 310-1, 310-2, 320-1, 320-2 and the co-planar waveguide 332.

The return currents for the centre track 332-1 predominantly flow through the first return track 332-2 and the second return track 332-3. In other words, due to the fundamental mode of the co-planar waveguide 332, if the currents traversing through a cross section of the co-planar waveguide 332 in yz-plane are integrated at any instance, it leads approximately to zero. The co-planar waveguide 332 also has high-order modes but those higher-order modes are usually not propagating. Furthermore, the input coupling can be designed to largely avoid exciting them, for example, by shorting the first return track 332-2 and the second return track 332-3 together. This may be in contrast to the active nulling geometry 200 and the passive nulling geometry 250, wherein a significant amount of current is induced in the other electrodes such as the trap RF electrodes 232, 282 which do not provide a controlled impedance return path.

The use of the co-planar waveguide 332 as the entangling electrode 332 provides a well-controlled path for return currents and prevents the microwave currents from flowing unpredictably along unwanted paths. It is also straightforward to control the impedance of the co-planar waveguide 332. The use of the co-planar waveguide 332 as the entangling electrode 332 may be advantageous in multi-zone traps, where any induced currents flowing along unwanted paths can lead to strong cross-talk between zones because the RF rails are common to all trap zones.

In some implementations, the trap axis of the 5-wire surface Paul trap formed by the collinear electrodes 310-1, 310-2, 320-1, 320-2, 330 may create a trap axis parallel to the centre track 332-1, at a distance d above the centre track 332-1. In this case, at the position of the charged particle 10 the magnetic field generated by the co-planar waveguide 330 is in the y-direction. In other words, the magnetic field direction generated by the co-planar waveguide at the position of the charged particle 10 is parallel to the substrate 301 and perpendicular to the direction of the centre track 332-1 or the co-planar waveguide 332.

The magnetic field distribution as shown in the right panel of FIG. 3a may be achieved by the inherent property of the co-planar waveguide 332 and robust to the material property or the specific dimensions of the tracks 332-1, 332-2, 332-3 so long as the overall symmetry is not broken. Since only one RF/microwave signal source is used to feed the centre track 332-1, there is no need to control the relative phases of the signals sent to the tracks 332-1, 332-2, 332-3, as in the case of the active nulling geometry 200 or the passive nulling geometry 250.

The partial nulling approach may have the following technical advantages:

1. Only one current source is required for the entangling electrode or the co-planar waveguide 332. The direction of the resulting oscillating magnetic field of the co-planar waveguide 332 is not susceptible to drifts in the amplitudes or phases of the microwave currents. Therefore, precise control or calibration of the amplitudes and phases of currents is not required.

2. The entangling electrode or the co-planar waveguide 332 relies on a symmetric design instead of detailed simulation, fabrication and control of induced currents. Therefore, precise design and fabrication of the entangling electrode 332 is not required. Since the co-planar waveguide 332 is compact, it leaves more space on the surface-electrode trap 300 for the other electrodes 310-1, 310-2, 320-1, 320-2. This can further reduce the induced current on the DC electrodes 310-1, 310-2 and the RF electrodes 320-1, 320-2. This can also allow the RF trap itself, formed with the RF electrodes 320-1, 320-2, to be better optimized, for example, by picking the geometry of the RF electrodes 320-1, 320-2 to maximize trap depth or harmonicity.

3. Since the co-planar waveguide 332 has a ground completely surrounding the signal it has reduced cross-talk (particularly if the ground is several penetration depths wide).

4. The quality of nulling is not susceptible to phase shifts along the electrode, which can be the case in the passive nulling geometry 250.

5. Since the entangling electrode 332 is a co-planar waveguide, a controlled impedance trace is used with well-defined paths for the signal and return currents.

6. The efficiency may be higher since the currents are located closer to the particles. Since all three pieces of conductors of the co-planar waveguide 332, namely the centre track 332-1, 332-2, 332-3, are close to the position of the trapped charged particle 10, the use of the co-planar waveguide 332 as the entangling electrode 332 may be efficient in terms of the electrical power required to produce a given gradient.

7. A node in the oscillating magnetic field is produced in the entire x-z plane centred on the particles position 10, and not just along a single line.

By configuring the trap axis of the 5-wire Paul trap, the charge particle 10 can be placed at a position where the charged particle 10 only experiences a magnetic field in y-direction.

The static magnetic field 40 may be applied to be parallel to the substrate 301 and perpendicular to the centre track 332-1 such that the quantization axis lies in the plane of the trap but perpendicular to the symmetry axis along the centre track 332-1 of the co-planar waveguide 332. If the trap centre is arranged such that the charged particle 10 is placed at a position where it only experiences a magnetic field parallel to the static magnetic field 40, the resulting oscillating magnetic field of the co-planar waveguide 332 is purely π-polarized.

In addition to the arrangement of the field direction at the position of the charged particle 10 as discussed above, the qubit states 11-1, 11-2 of the charged particle 10 may be chosen such that the qubit transition 16 does not couple to the microwave field generated by the entangling electrode or the co-planar waveguide 332. The oscillating magnetic field does not contain a component which produces a significant coupling to any transition, which does not involve any change of the motion of the charged particle 10, from the qubit states when the significance of the coupling is determined by the detuning of the transition and the strength of the polarization component or "Rabi frequency". The term "Rabi frequency" will be used to refer to the degree of coupling between any two states of the particle to the oscillating magnetic field, including "carrier" transitions which do not involve any change of motion of the particle, and "motional sideband" transitions which change the motional state. Such arrangement will be referred to as the partial nulling geometry in this specification, as explained in more detail below.

In the partial nulling geometry, the entangling electrode 232 may be designed to reliably produce a predetermined polarisation at the position of the charged particle 10 and the static magnetic field 40 and the qubit transition 16 can be chosen accordingly such that the predetermined polarisation component does not couple to the qubit transition 16. However, the gradient of the oscillating magnetic field which couples to the motional sideband of the qubit transition 16 producing a spin-dependent force may be present. In other words, the oscillating magnetic field component which couples to the qubit transition 16 is absent at the position of the charged particle 10 but present in the vicinity of the position of the charged particle 10. The gradient is formed such that the magnitude of the component increases away from the trap centre.

The partial nulling may be applied to any ground-level or metastable-level qubit.

For example, in FIG. 3a, the position of the charged particle 10 is directly above, in z-direction, the centre track 332-1, where the direction of the oscillating magnetic field generated by the co-planar waveguide is in y-direction, parallel to the substrate 310 and perpendicular to the direction of the co-planar waveguide 332. Since the static magnetic field 40 is in the y-direction, the charged particle 10 only experiences a n-polarised oscillating magnetic field. If a "spin-½" particle (e.g. a particle with no nuclear spin) is chosen as the charged particle 10, then the qubit transition 16 is the only ground-level transition, which is σ-polarised.

Therefore, the qubit transition 16 at the trap centre does not couple to the purely π-polarised oscillating magnetic field thereby leading to the same result as a completely nulled field, regardless of the actual field amplitude. However, away from the trap centre or the position of the charged particle 10, there is a σ-polarized component whose strength increases with the distance from the trap centre. As a result, there is a strong gradient of the σ-polarized component of the oscillating magnetic field, which may be used to generate entanglement.

Since partial nulling only requires a single entangling electrode 332, it is not sensitive to relative amplitude or phase stability or differential noise between multiple electrodes. In some implementations, partial nulling may be applied to a qubit transition 16 in a level with hyperfine structure if the frequencies of all transitions from the qubit states, which couple to the magnetic field, are sufficiently far from the frequency of the qubit transition 16 to render the interaction insignificant. For example, in the hyperfine qubit transition 16 between $S^{3,+3}_{1/2}$ and $S^{4,+4}_{1/2}$ states of $^{43}Ca^+$, the Zeeman splittings between the states in each manifold, F=3 and F=4 need to be large compared with the coupling "Rabi frequency" created by the RF/microwave oscillating field generated by the co-planar waveguide 332. For example, for ground level transitions in $^{43}Ca^+$ the static magnetic field 40 of 150 mT may produce a 50 MHz splitting between transitions. Oscillating magnetic fields may be considered to be partially nulled so long as the "Rabi frequency" on transitions out of the qubit states are sufficiently small compared with this splitting.

In some implementations, the widths of the return track 332-2, 332-3 may be determined to be larger than the skin depth or the penetration depth of the material. At RF/microwave frequencies, this is highly dependent on the operation frequency and the material. The surface-electrode trap 100 may be operated at cryogenic temperatures where the resistance and hence penetration depth is lower than those at room temperature.

Figure 3B:
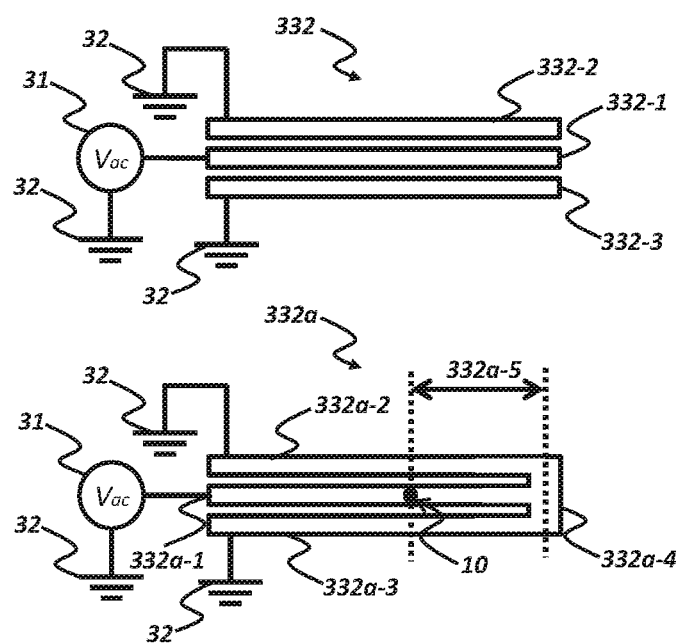
FIG. 3b is a schematic diagram of a co-planar waveguide on a surface-electrode trap for producing a partially nulled in magnetic field distribution.

FIG. 3b is a schematic diagram of a co-planar waveguide on a surface-electrode trap for producing a partially nulled magnetic field distribution.

An upper panel of the FIG. 3b shows an electrical connection arrangement of the co-planar waveguide 332.

In order to generate the oscillating magnetic field at an RF/microwave frequency from the co-planar waveguide, a signal generator 31, configured to generate a RF/microwave frequency current, can be connected to the centre track 332-1.

A ground terminal 32, which is common to the circuitry of the surface-electrode trap 300, including the 5-wire surface Paul trap is connected to the first return track 332-2 and the second return track 332-3. An RF/microwave ground of the signal generator 31 is also connected to the ground terminal 32. As discussed above, these provide a controlled impedance ground path, which minimises spurious coupling of the signals generated from the co-planar waveguide onto other parts of the trap.

The lower panel shows the co-planar waveguide 332a including a centre track 332a-1, a first return track 332a-2 and a second return track 332a-3. The electrical connection arrangement to generate the oscillating magnetic field from the co-planar waveguide 332a with the signal generator 31 and the ground terminal 32, is as in the upper panel of the FIG. 3b.

In some implementations, the co-planar waveguide 332a may further include a shorting connection 332a-4, electrically connecting the ground track 332a-1, the first return track 332a-2 and the second return track 332a-3. The shorting connection 332a-4 is therefore connected to ground via the first return track 332a-2 and the second return track 332a-3. In this case, the charged particle 10 may be placed a first distance 332a-5 away from the shorting connection. In order to avoid end effects in the magnetic field distribution, the first distance 332a-5 may be larger than, for example, five times of the width of the centre track 332a-1. The shorting connection 332a-4 is included to place the charged particle 10 near an anti-node of the current of the co-planar waveguide 332a. Therefore, the charged particle 10 may be placed as close as possible to the shorting connection 332a-4 without encountering end effects. For example, the charged particle 10 may be placed much closer than $\lambda/4$ from the shorting connection 332a-4, where $\lambda$ is the wavelength of the microwave currents in the co-planar waveguide 332a.

The oscillating RF/microwave currents may be fed into the tracks 332a-1, 332a-2, 332a-3 from an end of the co-planar waveguide 332a opposite to the end where the shorting connection 332a-4 is placed.

In some implementations, the shorting connection 332a-4 may be electrically connected to the centre track 332a-1, the first return track 332a-2 and the second return track 332a-3 towards the end, in x-direction, of the region defined by the 5-wire surface Paul trap.

With the shorting connection 332a-4, for a given power input into the co-planar waveguide 332a, the co-planar waveguide 332a can provide a larger current near the position of the charged particle 10 compared to the co-planar waveguide 332 without the shorting connection 332a-4. Furthermore, the co-planar waveguide 332a does not require a separate off-chip termination. The field gradient at the position of the charged particles 10 can be further increased by implementing impedance matching between the source and the coplanar waveguide.

The traps used in partial nulling are completely symmetric, and so do not require a precise and detailed simulation or fabrication to produce the required field distribution at the centre of the trap or at the position of the charged particle 10. In contrast to the active nulling 200 and passive nulling 250 geometries, the partial nulling geometry 300 with the co-planar waveguide 332, 332a design provides a well-defined current return path. This allows controlled determination on the impedance of the co-planar waveguide 332, 332a and therefore allows an accurate design based on a simple simulation.

Because the width of the first return track 332-2, 332a-2 and the second return track 332-3, 332a-3 can be larger than the typical penetration length or the skin depth of the RF/microwave currents, which tend to be concentrated near the edge of the tracks of the co-planar waveguide 332, the first return track 332-2, 332a-2 and the second return track 332-3, 332a-3 both allow return currents to flow, and also provides an effective screening layer to minimise induced RF/microwave currents in the trap RF electrodes 320-1, 320-2 and hence strongly suppresses cross-talk.

FIG. 4 is a schematic diagram of an exemplary embodiment of a surface-electrode trap for producing a partially nulled magnetic field distribution.

A surface-electrode trap 400 shown in FIG. 4 may be part of a larger design where many units of the surface-electrode trap 400 are integrated as an array of the plurality of surface-electrode trap 400.

In some implementations, the surface-electrode trap 400 may comprise a metal film deposited on a substrate. For example, the metal film may comprise gold and the thickness of the gold film may range from 100 nm to 10 µm. Starting from a uniform metal film, the patterns may be fabricated via standard lithographic techniques, such as photolithography. The adequate mode of lithography may be selected depending on the material and the feature sizes, such as width or height of the features. For example, the metal film may be deposited by electroplating around a patterned photoresist material deposited on the substrate.

The surface-electrode trap 400 includes a first DC electrode 410-1, second DC electrode 410-2, a first RF electrode 420-1, a second RF electrode 420-2, and a co-planar waveguide or an entangling electrode 432.

In the example of FIG. 4, the first DC electrode 410-1 and the second DC electrode 410-2 respectively comprise at least 5 sections. This provides the degrees of freedom needed to control the position of the charged particle 10 in the x-direction. Using three consecutive sections of the first DC electrode 410-1 and the second DC electrode 410-2, a potential well can be formed to confine a charged particle 10 in the x-direction. A plurality of sections of the first DC electrode 410-1 and the second DC electrode 410-2 may be used when separating a pair of charged particles 10 that start in the same potential well.

The first DC electrode 410-1 and the second DC electrode 410-2 cover a distance of 400 microns in the x-direction. The charged particles 10 may be loaded within this region and the confinement in x-direction may be provided by the first DC electrode 410-1 and the second DC electrode 410-2.

The widths of the first RF electrode 420-1 and the second RF electrode 420-2 may range from 10 to 500 microns, for example 28 microns.

The length of the co-planar waveguide 432 in x-direction may be between 100 microns to 100 mm.

A gap, in y-direction, between the first DC electrode 410-1 and the first RF electrode 420-1, or between the second DC electrode 410-2 and the second RF electrode 420-2 may be between 1 to 50 microns, for example, 5 microns. The gap is not dependent on the operation frequency, and is smaller than the height of the charged particle 10 above the surface-electrode trap 400. The lower limit of the gap is set by fabrication tolerances.

The co-planar waveguide 432 includes a centre track 432-1, a first return track 432-2 and a second return track 432-3. These tracks extend in x-direction and the centre track 432-1 may be interposed by the first return track 432-2 and the second return track 432-3.

The length, or the extent in the x-direction, of the first return track 432-2 and the second return track 432-3 may range from 1 to 100 microns, for example 10 microns.

A gap, in y-direction, between the first RF electrode 420-1 and the first return track 432-2 or between the second RF electrode 420-2 and the second return track 432-3 may be between 1 to 50 microns, for example, 5 microns.

A gap, in y-direction, between the centre track 432-1 and the first return track 432-2 or between the centre track 432-1 and the second return track 432-3 may be between 1 to 50 microns, for example 10 microns.

The co-planar waveguide 432 may include a shorting connection 432-4 which electrically connects the centre track 432-1, the first return track 432-2 and the second return track 432-3.

As explained above in FIG. 3b, with the shorting connection 432-4 the co-planar waveguide 432 can allow a larger field gradient at the charged particle 10 for the same input power compared to the co-planar waveguide 432 without the shorting connection 432-4. Furthermore, the co-planar waveguide 432 does not require a separate off-chip termination.

The charged particle position 10 may be trapped above the centre track 432-1 in z-direction. The distance, in z-direction, between the charged particle 10 and the centre track 432-1 may range from 20 to 100 microns.

The position of the charged particle 10, in x-direction, may be determined according to the arrangement of the first DC electrode 410-1 and the second DC electrode 410-2.

Also, the position of the charged particle 10, in x-direction, may also be determined such that it is sufficiently far from the shorting connection 432-4 to avoid end effects. A first distance 432-5 between the shorting connection 432-4 and the position of the charged particle 10 in x-direction should be much smaller than $\lambda/4$, where $\lambda$ is the wavelength of the microwaves in the co-planar waveguide 432.

Figure 5:
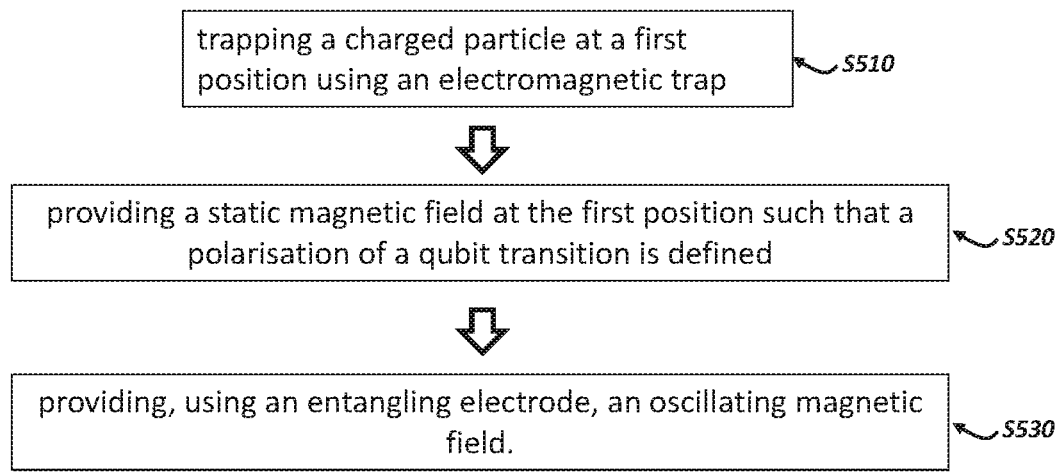
FIG. 5 is a flowchart of a method for entangling charged particles.

FIG. 5 is a flowchart of a method for entangling charged particles.

In step 510, the charged particle 10 is trapped at a first position using an electromagnetic trap, 110, 120, 130, 210, 220, 230, 260, 270, 280, 310, 320, 330, 410, 420, 430;

In step 520, the static magnetic field 40 is provided at the first position such that the qubit transition 16 of the charged particle 10 is defined.

In step 530, an oscillating magnetic field is provided using the entangling electrode 332, 332a, 432. The oscillating magnetic field present at the first position does not contain a polarisation component which directly couples to the qubit transition. The oscillating magnetic field has a spatial gradient at the first position, of the polarisation component of the oscillating magnetic field which couples the qubit transition to the motion of the charged particle. At this step a partial nulling of the field amplitude or a partially nulled magnetic field distribution is facilitated at the position of the charged particle 10.

The embodiments of the invention shown in the drawings and described hereinbefore are exemplary embodiments only and are not intended to limit the scope of the invention, which is defined by the claims hereafter. It is intended that any combination of non-mutually exclusive features described herein are within the scope of the present invention.

The invention claimed is:

1. A method comprising:
trapping a charged particle at a first position using an electromagnetic trap;
providing a static magnetic field at the first position such that a qubit transition of the charged particle is defined; and
providing, using an entangling electrode, an oscillating magnetic field,
wherein the oscillating magnetic field present at the first position does not contain a polarisation component which directly couples to the qubit transition, and
wherein the oscillating magnetic field has a spatial gradient at the first position, of the polarisation component of the oscillating magnetic field which couples the qubit transition to the motion of the charged particle
wherein the entangling electrode extends in a first direction perpendicular to the direction of the static magnetic field,
wherein the qubit transition is a sigma transition between states whose respective magnetic quantum numbers differ by 1, and
wherein the oscillating magnetic field at the first position is linearly polarised, parallel to the direction of the static magnetic field such that the oscillating magnetic field does not couple directly to the qubit transition,
wherein the entangling electrode is a co-planar waveguide.

2. The method of claim 1,
wherein the co-planar waveguide comprises:
a centre track;
a first return track; and
a second return track,
wherein the centre track extends in the first direction between the first return track and the second return track, and
wherein the first return track and the second return track are electrically connected to a ground terminal shared with the electromagnetic trap.

3. The method of claim 2,
wherein the co-planar waveguide further comprises a shorting connection,
wherein the first return track, the second return track and the centre track are electrically connected to a shorting connection at one end, and
wherein the distance in the first direction between the first position and the shorting connection is smaller than $\lambda/4$, wherein $\lambda$ is a wavelength of the oscillating magnetic field in the co-planar waveguide.

4. The method of claim 2,
wherein the co-planar waveguide is formed to be symmetric about the centre track.

5. The method of claim 1, further comprising:
trapping a second charged particle at a second position using the electromagnetic trap;
providing the static magnetic field such that the magnitude and the direction of the static magnetic field is the same at the first position and the second position; and
providing, using the entangling electrode, the oscillating magnetic field for the second charged particle,
wherein the entangling electrode extends in a direction parallel to a direction of a line connecting the first position and the second position such that the oscillating magnetic field present at the second position does not contain a polarisation component which couples to a qubit transition of the second charged particle.

6. The method of claim 5, further comprising:
creating a spin-dependent force on the charged particle and the second charged particle by exciting one or more motional sidebands of the qubit transition with the oscillating magnetic field.

7. A device for generating quantum entanglement between charged particles, comprising:
a substrate having a first face and a second face opposite to each other;
a trap electrode disposed on the first face of the planar substrate configured, in response to a voltage, to form an electromagnetic trap for trapping a charged particle at a first position such that the first face is interposed between the first position and the second face; and
an entangling electrode disposed on the first face of the planar substrate and extending in a first direction along the substrate, configured, in response to an oscillating current, to generate an oscillating magnetic field parallel to the substrate and perpendicular to the first direction at the first position,
wherein the entangling electrode is a co-planar waveguide.

8. The device of claim 7,
wherein the co-planar waveguide comprises:
a centre track;
a first return track; and
a second return track,
wherein the centre track extends in the first direction between the first return track and the second return track, and
wherein the first return track and the second return track are electrically connected to a terminal held at fixed potential to a ground terminal of the trap electrode.

9. The device of claim 8,
wherein the first return track, the second return track and the centre track are electrically connected to a shorting connection at one end.

10. The device of claim 8,
wherein a width of the first return track and the second return track is wider than a penetration depth of a material for the first return track and the second return track at a frequency of the oscillating magnetic field.

11. The device of claim 7,
wherein the electromagnetic trap is a surface-electrode Paul trap.

12. The device of claim 11,
wherein the surface-electrode Paul trap is configured such that a symmetry axis of the electromagnetic trap lies along the first direction.

13. The device of claim 12,
wherein the surface-electrode Paul trap comprises:
a first RF electrode and a second RF electrode extending in the first direction; and
a first DC electrode and a second DC electrode extending in the first direction,
wherein the first RF electrode and the second RF electrode are disposed between the first DC electrode and the second DC electrode, and
the entangling electrode is disposed between the first RF electrode and the second RF electrode.

14. A system for quantum information processing comprising:
a plurality of charged particles;
the device of claim 7 for entangling two or more of the plurality of charged particles;
a device for generating a static magnetic field; and
a signal generator for generating electric signals for the electromagnetic trap and the entangling electrode.

* * * * *